US010651713B2

(12) United States Patent
Pietromonaco

(10) Patent No.: US 10,651,713 B2
(45) Date of Patent: May 12, 2020

(54) GROUPED TOOTH ELECTRIC MOTOR

(71) Applicant: ARM Ltd., Cambridge (GB)

(72) Inventor: David Victor Pietromonaco, Cupertino, CA (US)

(73) Assignee: ARM Ltd., Cambridge (GB)

(*) Notice: Subject to any disclaimer, the term of this patent is extended or adjusted under 35 U.S.C. 154(b) by 655 days.

(21) Appl. No.: 15/204,500

(22) Filed: Jul. 7, 2016

(65) Prior Publication Data
US 2018/0013337 A1    Jan. 11, 2018

(51) Int. Cl.
*H02K 19/10*    (2006.01)
*H02K 19/06*    (2006.01)
(Continued)

(52) U.S. Cl.
CPC ........... *H02K 19/103* (2013.01); *H02K 1/14* (2013.01); *H02K 1/24* (2013.01); *H02K 1/246* (2013.01); *H02K 3/18* (2013.01); *H02K 11/0094* (2013.01); *H02K 11/33* (2016.01); *H02K 19/06* (2013.01); *H02P 25/08* (2013.01); *H02K 3/02* (2013.01); *H02K 3/28* (2013.01)

(58) Field of Classification Search
CPC ........... H02K 1/14; H02K 1/24; H02K 1/246; H02K 11/0094; H02K 11/33; H02K 19/06; H02K 19/103; H02K 3/18; H02K 3/02; H02K 3/28; H02P 25/08
USPC .......... 310/49.44, 49.45, 106, 116, 129, 158, 310/168, 216.073, 216.072, 216.074, 310/216.075, 216.096, 216.107, 216.112, 310/162, 185, 193, 261, 269, 186, 261.1; 318/701
See application file for complete search history.

(56) References Cited

U.S. PATENT DOCUMENTS

| 2,677,090 A | * | 4/1954 | Fleming-Williams ...................... H02K 37/00 310/188 |
| 3,732,561 A | * | 5/1973 | McGinnis ............... G09F 11/23 340/815.64 |

(Continued)

FOREIGN PATENT DOCUMENTS

| CN | 01147721 A | 10/1995 |
| CN | 1147721 A | 4/1997 |

(Continued)

OTHER PUBLICATIONS

Invitation to Pay Additional Fees and, where applicable, Protest Fee, dated Nov. 10, 2017, International Application No. PCT/GB2017/051989, 12 pgs.

(Continued)

*Primary Examiner* — Alfonso Perez Borroto
*Assistant Examiner* — Ahmed Elnakib
(74) *Attorney, Agent, or Firm* — Berkeley Law & Technology Group, LLP

(57) ABSTRACT

An electric motor may comprise a rotor and a stator comprising rotor and stator teeth, respectively. A non-uniform angular spacing or grouping of rotor teeth may facilitate desired rotational speeds of the rotor. In an embodiment, such non-uniform angular spacing may be such that for at least a subset of the rotor teeth comprising a first, second, and third rotor tooth, an angular spacing between the first and the second rotor teeth is at least twice an angular spacing between the second and the third rotor teeth.

12 Claims, 9 Drawing Sheets

(51) Int. Cl.
*H02K 11/00* (2016.01)
*H02K 1/24* (2006.01)
*H02K 11/33* (2016.01)
*H02K 1/14* (2006.01)
*H02K 3/18* (2006.01)
*H02P 25/08* (2016.01)
*H02K 3/02* (2006.01)
*H02K 3/28* (2006.01)

(56) References Cited

U.S. PATENT DOCUMENTS

| | | | | |
|---|---|---|---|---|
| 4,883,999 | A * | 11/1989 | Hendershot | H02K 19/103 310/216.071 |
| 5,111,095 | A * | 5/1992 | Hendershot | H02K 19/103 174/DIG. 19 |
| 5,852,334 | A | 12/1998 | Pengov | |
| 6,028,385 | A * | 2/2000 | Pengov | H02K 19/103 310/166 |
| 6,051,903 | A * | 4/2000 | Pengov | H02K 19/103 310/162 |
| 8,450,954 | B2 | 5/2013 | Pietromonaco | |
| 9,130,433 | B2 | 9/2015 | Pietromonaco | |
| 9,214,837 | B2 | 12/2015 | Pietromonaco | |
| 2006/0192518 | A1 * | 8/2006 | Adra | H02K 1/246 318/701 |
| 2010/0123426 | A1 * | 5/2010 | Nashiki | H02K 1/12 318/701 |
| 2011/0037331 | A1 * | 2/2011 | Jang | H02K 3/522 310/71 |
| 2014/0084875 | A1 * | 3/2014 | Bender | H02J 15/00 320/166 |
| 2014/0306563 | A1 | 10/2014 | Oyama et al. | |
| 2015/0003977 | A1 | 1/2015 | Yabuuchi et al. | |
| 2015/0326100 | A1 | 11/2015 | Pietromonaco | |
| 2016/0065041 | A1 | 3/2016 | Pietromonaco | |
| 2016/0079889 | A1 | 3/2016 | Pietromonaco | |
| 2016/0079893 | A1 | 3/2016 | Pietromonaco | |
| 2017/0324308 | A1 * | 11/2017 | Pietromonaco | H02P 25/16 |
| 2017/0338723 | A1 * | 11/2017 | Pietromonaco | H02K 1/08 |
| 2017/0359012 | A1 * | 12/2017 | Pietromonaco | H02P 25/086 |
| 2018/0013337 | A1 * | 1/2018 | Pietromonaco | H02K 11/33 |

FOREIGN PATENT DOCUMENTS

| | | |
|---|---|---|
| CN | 0203289296 A1 | 11/2013 |
| DE | 3246596 C1 | 4/1984 |
| WO | 2011004546 A1 | 1/2011 |
| WO | 2011030499 A1 | 3/2011 |

OTHER PUBLICATIONS

Notification Concerning Transmittal of International Preliminary Report on Patentability, App. No. PCT/GB2017/051989, Filed Jul. 6, 2017, dated Jan. 17, 2019, 12 Pages.
Notification of Transmittal of the International Search Report and the Written Opinion of the International Searching Authority, or the Declaration, App. No. PCT/GB2017/051989, Filed Jul. 6, 2017, dated Jan. 12, 2018, 8 Pages.
Written Opinion of the International Searching Authority, App No. PCT/GB2017/051989, Filed Jul. 6, 2017, dated Jan. 17, 2018, 12 Pages.
Communication pursuant to Rules 161(1) and 162 EPC, dated Feb. 14, 2019, EP Application No. 17739662.9, 3 pgs.
Response to Communication pursuant to Rules 161(1) and 162 EPC, filed Aug. 20, 2019, EP Application No. 17739662.9, 12 pgs.
Acknowledgment of Receipt, dated Aug. 20, 2019, Response to Communication pursuant to Rules 161(1) and 162 EPC, filed Aug. 20, 2019, EP Application No. 17739662.9, 1 pg.

* cited by examiner

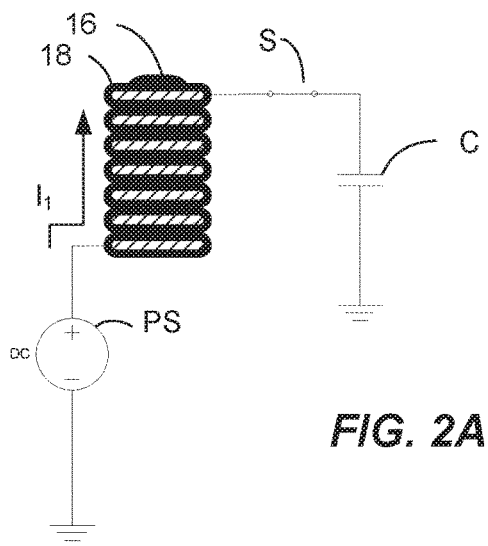
FIG. 2A
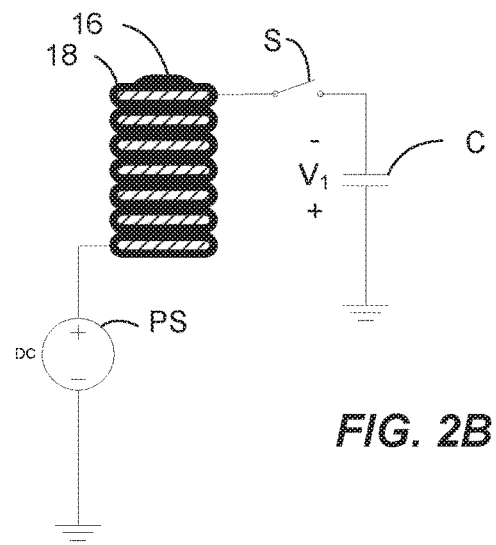
FIG. 2B
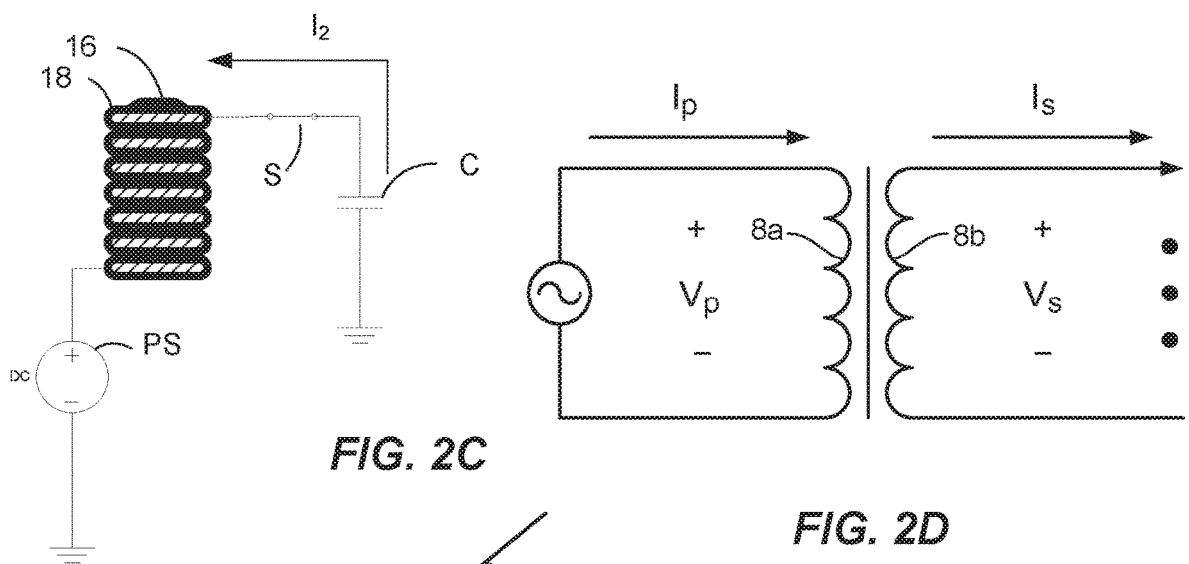
FIG. 2C
FIG. 2D
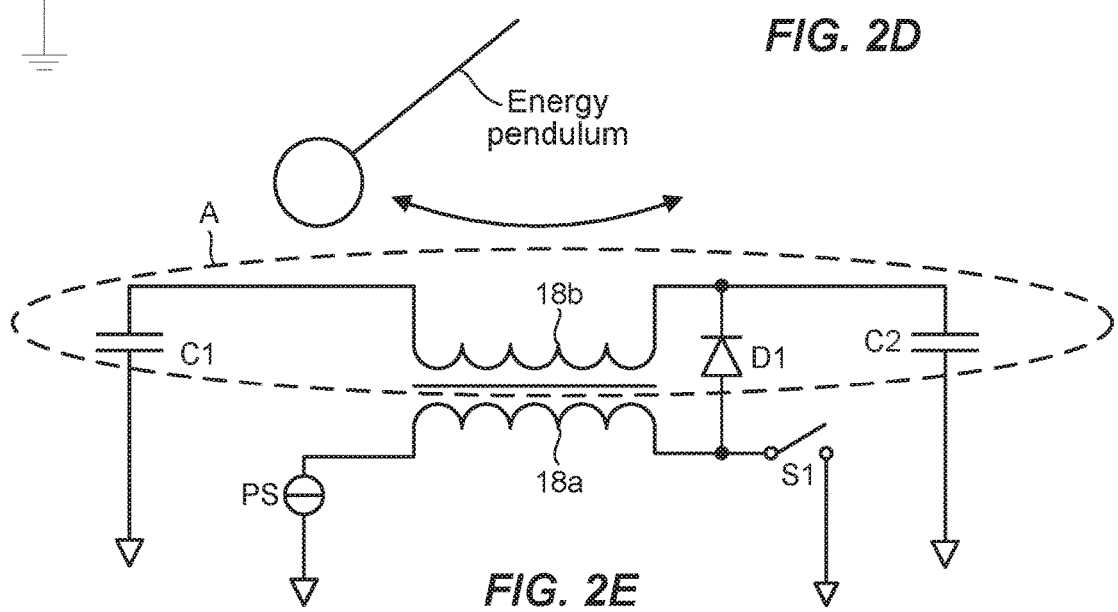
FIG. 2E

GROUPED TOOTH ELECTRIC MOTOR

FIELD

This disclosure relates generally to electric motors.

INFORMATION

Different electric motors may have different characteristics that may make them well-suited to some tasks and ill-suited to other tasks. In certain types of situations, electric motors may be desirable for providing a torque, such as to a drive shaft. In some cases, it may be desirable that the provided torque induce rotation of the drive shaft at a desired rotational speed, such as at a desired number of rotations per unit time (e.g., rotations per minute, RPM). For example, some electric motors may be capable of efficiently rotating a drive shaft at high RPMs, but may be unable to efficiently rotate a drive shaft at low RPMs. In contrast, some other electric motors may be capable of providing efficient rotation of a drive shaft at low RPMs, but not at high RPMs.

Likewise, in some cases, it may be desirable to use an electric motor with relatively significant amounts of torque and/or a relatively flat torque curve. However, in some implementations, an electric motor capable of providing relatively significant amounts of torque and/or a relatively flat torque curve might not be able to induce rotation of a drive shaft at desired rotational speeds (e.g., RPMs). By way of example, but not limitation, a switched reluctance motor with a large number of poles (e.g., 24 stator teeth) may rotate a drive shaft more slowly than a switched reluctance motor with comparatively fewer poles (e.g., 6 stator teeth).

Nevertheless, there may be a desire for an electric motor that, for example, may achieve high drive shaft rotational speed (e.g., approximately 4000 RPMs and higher), such as with a motor that might be otherwise ill-suited for such operation.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

FIGS. 2A-2C are illustrations of an embodiment of coil windings and supporting circuitry;

FIG. 2D is an illustration of a transformer embodiment;

FIG. 2E is an illustration of an embodiment of split coil windings and supporting circuitry;

Figure 1A:
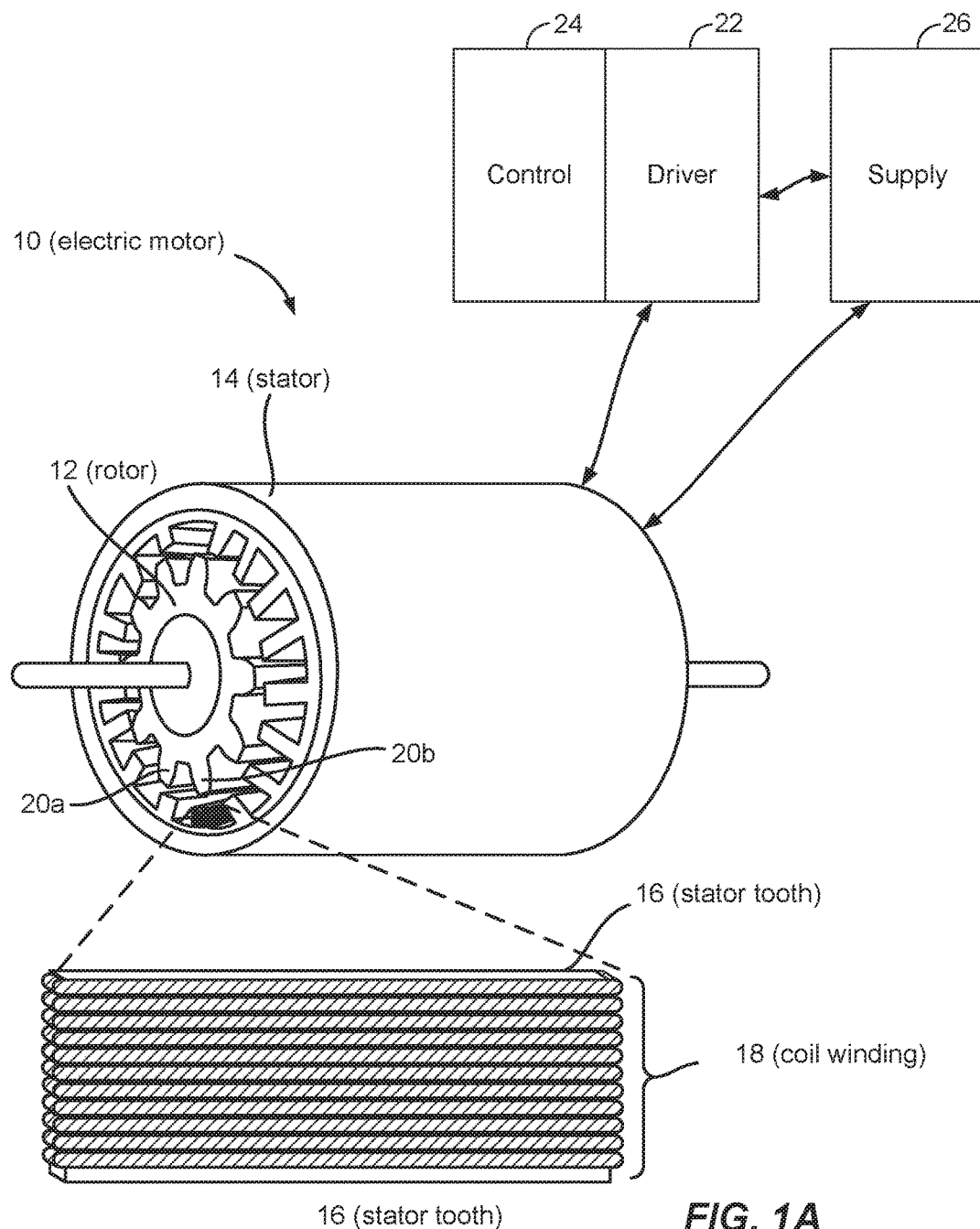
FIG. 1A is an illustration of an embodiment of an electric motor.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

Typical electric motors include, among other things, a stator and a rotor. The rotor may be arranged to rotate relative the stator in response to one or more torque pulses provided by the stator. The torque pulses may be based, at least partly, on one or more electromagnetic fields (EMF) generated on a stator tooth of the stator. The EMF may be generated by driving a current through a coil winding wrapped around the stator tooth. The one or more EMFs may provide an attractive or repulsive force on one or more teeth of the rotor, which may apply a torque to the one or more teeth of the rotor to move relative to the stator tooth with respect to which the one or more EMFs are generated. In turn, the rotating rotor may apply a torque to a shaft, such as a drive shaft of the electric motor, to rotate. However, as shall be explained in greater detail hereinafter, achieving desired rotational speed of the rotor may be complex or difficult.

By way of example, some electric motor types may be capable of rotating at high numbers of rotations per unit time (e.g., RPM). For some such motors, however, at high RPM, the torque delivered may approach zero as RPMs approach a maximum rotational speed threshold. In contrast, some electric motors may operate efficiently (e.g., high power density and high torque output) and may be able to deliver torque as RPMs approach a maximum rotational speed threshold. For instance, in one embodiment, desired rotational speed may be achieved by operating an electric motor inefficiently, such as outside of operational characteristics. Nevertheless, there may be a desire for electric motors that operate efficiently, that may be capable of achieving desired rotational speed, and/or that may be able to provide desired torque output at high rotational speeds. As referred to herein, efficiency of an electric motor refers to a ratio of power output from the electric motor, such as in the form of torque provided by a rotor to a shaft, to power input to the electric motor, such as in the form of one or more electric pulses. In one implementation, to achieve desired efficiency, stator teeth may be arranged relative rotor teeth for desired magnetic field interaction.

In certain implementations, efficient electric motors may generate more power than inefficient motors. Power density of electric motors refers to a measure of power per unit volume, often expressed as $W/m^3$. Thus, a first electric motor with 24 stator teeth and 16 rotor teeth, for example, may be configured to have a first power density by generating one EMF on one stator tooth per motor cycle. By contrast, a second electric motor of approximately the same volume as the first electric motor and also with 24 stator teeth and 16 rotor teeth, may be configured to have a second power density approximately four times that of the first power density, by generating an EMF on four stator teeth at approximately a same time. In some applications, such as electric motors for vehicles, a high power density may be desirable.

Figure 3A:
FIGS. 3A-3C are illustrations of an embodiment of a rotor and stator.

As noted above, there may also be a desire for electric motors with high rotational speeds. For example, the electric motor in drones may rotate 4,000, 5,000, 10,000, or more times per minute. In at least some cases, however, such as for example some switched reluctance electric motors with a large number of poles, electric motors may be unable to rotate at desired rotational speeds, may be unable to rotate at desired speeds while operating at desired efficiency levels, or may be unable to provide sufficient power or torque output at high RPM. FIG. 3A illustrates a sample stator/rotor arrangement for an example switched reluctance motor with 24 poles (e.g., stator teeth) and 16 rotor teeth. This example motor may operate efficiently and have a high power density and torque output at low RPMs. By way of example, one such electric motor may include one or more electrical components that may limit rotational speed of a rotor (e.g., such as by charge and/or discharge times). For example, charge and discharge of the comparatively large number of stator coils, charge and/or discharge of a capacitor or switching element of a driver circuit of one example electric motor, etc. may impose timing constraints, such as going to an amount of time to devote to a charge cycle of an electric motor. Thus, in one implementation, the time to charge and/or discharge a stator coil, charge and/or discharge the capacitor, etc. may limit the number of cycles that the electric motor may perform during a unit of time. There may be a desire, therefore, to overcome timing-related constraints and achieve desired rotational speed.

Figure 3B:
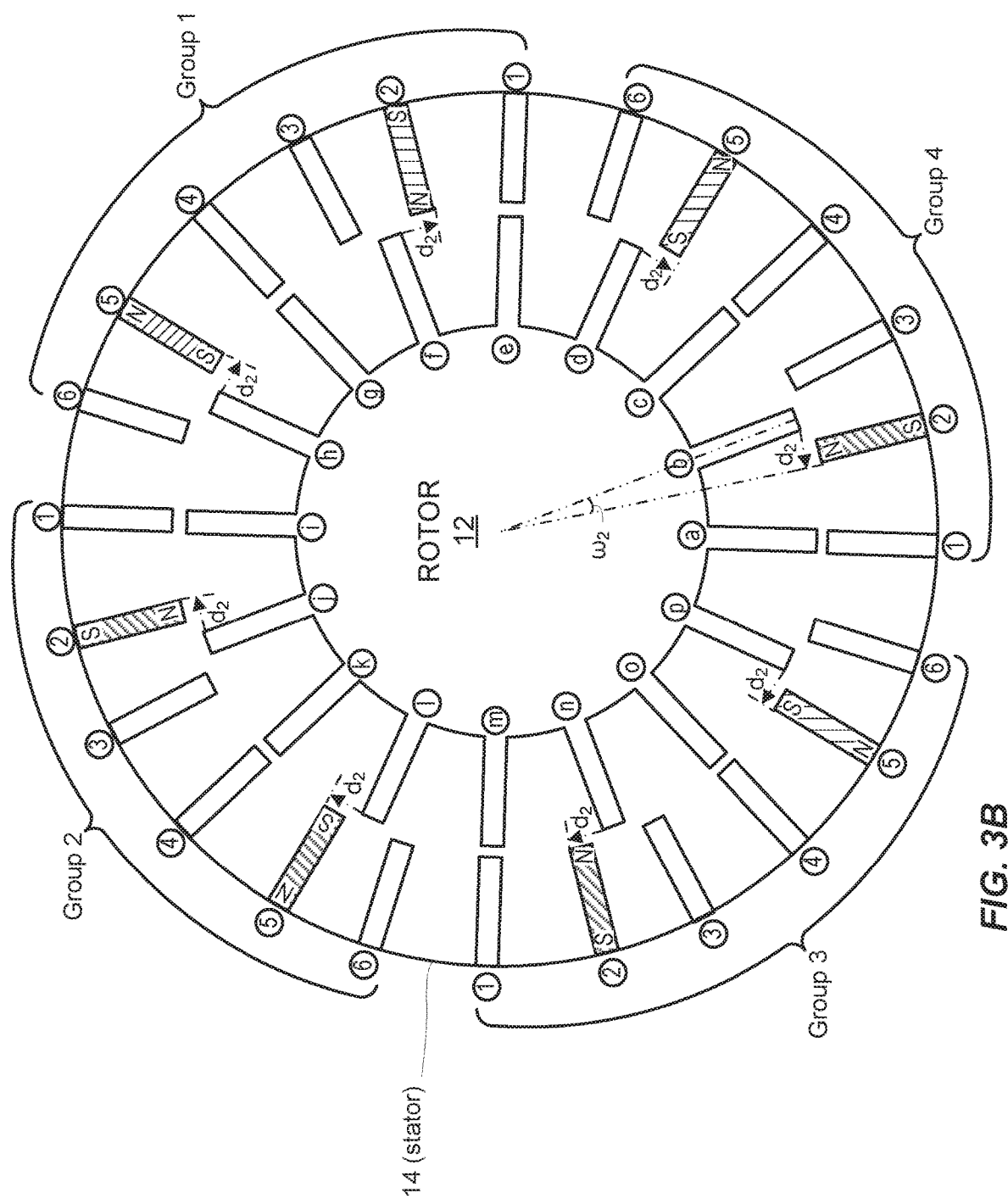
Figure 3C:

As mentioned above, and in addition to operating efficiently, there may be a desire to increase a rotational speed of certain electric motors. Further, it may be desirable to do so without adding complexity to the electric motors, such as the complexity added by mechanical gearing systems, transmissions, etc. However, as noted, there may be one or more factors that may hinder the ability of an electric motor to achieve desired rotational speeds, such as limiting the number of cycles that an electric motor may perform during a unit of time. As shall be discussed, one method for achieving desired rotational speeds may comprise the use of non-uniform spacing or grouping of rotor teeth. To understand how non-uniform spacing of rotor teeth might be useful, a brief discussion of uniform rotor teeth spacing is first presented. FIG. 3A illustrates a rotor and stator combination comprising a rotor 12 having a plurality of rotor teeth, labeled 'a' to 'p'. As should be apparent, a spacing between each of rotor teeth a-p is approximately uniform. Stator 14 may have a plurality of stator teeth grouped into group numbers 1-4 in FIG. 3A and labeled 1-6 in each respective group, for ease of explanation. FIGS. 3A-3C illustrate arrangements of rotor 12 relative to stator 14 at different times and responsive to one or more EMFs. To indicate formation of an EMF, FIGS. 3A-3C use a slanted line pattern fill in stator teeth to indicate "active" stator teeth (e.g., a stator tooth in which current is pulsed through a coil winding wrapped about the stator tooth) along with an indication of 'N' or 'S' to refer to EMF orientation. Thus, a stator tooth with an 'N' at an extremity closest to rotor 12 may have an approximately opposite EMF as compared with a stator tooth with an 'S' at an extremity closest to rotor 12. For instance, in one case, stator tooth 1 in Group 1 may have an approximately opposite EMF compared to that of stator tooth 4 in Group 1.

At a first time, $t_0$, current may be driven through coil windings of selected stator teeth in order to provide a torque on one or more teeth of rotor 12. For instance, FIG. 3A shows teeth 1 and 4 of each of groups 1-4 in an "active" state in which an EMF is being generated and a torque is being provided to rotor 12. One or more current pulses may be driven through one or more coil windings of stator tooth 1 of each of groups 1-4, such as from a power source, and a field may be formed, as indicated by the N pole shown on the closest extremity of each stator tooth 1 of groups 1-4. The formed EMF may interact with rotor teeth a, e, i, and m and provide a torque on rotor 12. The torque provided by each of stator teeth 1 of groups 1-4 may engender movement of rotor 12, such as an angular rotation of $\omega_1$. While the label for angular rotation $\omega_1$ is only shown as between rotor tooth a and stator tooth 1 of group number 4, this is merely to maintain readability of FIG. 3A. While rotation is typically thought of in terms of radians, FIG. 3 also illustrates a length of an arc that a point at an extremity of a rotor tooth may travel responsive to an EMF, as shown by $d_1$. Similarly, one or more current pulses may be driven through one or more coil windings of stator tooth 4 of each of groups 1-4, such as from a charge storage device for recapturing charge (as shall be discussed in further detail hereinafter), and a corresponding EMF may be formed, as indicated by the position of the S pole shown on stator teeth 4 of groups 1-4. The EMF formed on stator teeth 4 of group numbers 1-4 may also provide a torque and contribute to rotation of rotor 12.

FIGS. 3B and 3C illustrate subsequent operation of stator 14 and rotor 12. For instance, after charge is driven through coil windings of stator teeth 1 and 4 of group numbers 1-4, charge may be driven through coil windings of stator teeth 2 and 5 of group numbers 1-4, as shown in FIG. 3B. An interaction between EMF and rotor teeth, such as between an EMF generated on stator tooth 2 of group number 4 and rotor tooth b, may cause further rotation of rotor 12, such as indicated by angular rotation $\omega_2$ and the length along an arc illustrated by $d_2$. As shown in FIG. 3C, current may be driven through coil windings of stator teeth 3 and 6 of group numbers 1-4, which may in turn yield a rotation of rotor 12 of approximately $\omega_3$ (also shown by length along an arc $d_3$). As should be appreciated, the rotational distance that rotor 12 rotates during motor cycles is approximately equal (e.g., $\omega_1 \approx \omega_2 \approx \omega_3$).

Thus, if each active stator tooth contributes a torque having a power P to the rotation of rotor 12, then the power density of a particular cycle may be 8P because eight different stator teeth engender 8 different EMFs. Also, however, it is noted that if a minimum period of time is needed in order to drive current through coil windings of desired stator teeth, that period of time may affect possible length along an arc of rotation (e.g., as shown by arc at the extremity of rotor tooth) that may be traveled per unit time. Taking for instance, coil winding 18, switch S, and charge storage device C in FIGS. 2A-2C as elements of an electric motor that may contribute timing-related constraints, a time $t_i$ may be used for charging and discharging coil winding 18, switching behavior of switch S, and/or charge and discharge of charge storage device C. Thus, a maximum angular distance (e.g., in radians) that may be traveled by a given rotor tooth, such as rotor tooth a in FIG. 3A, per unit time may be limited by the time $t_i$ for charge and discharge of charge storage device C and/or switching behavior of switch S.

By way of illustrative example, if we assume for simplicity that time $t_i$ equals approximately 2.0 ms (e.g., that in approximately 1.0 ms an EMF builds up in at a stator tooth and in an additional approximately 1.0 ms, the EMF discharges) we can determine a maximum rotational speed for rotor 12. Because a complete rotation is $2\pi$ radians and there are 24 stator teeth in FIGS. 3A-3C, we can determine that at each charge/discharge cycle, $t_i$, rotor 12 will rotate by $$\frac{1}{24}\pi$$

radians $$\left(\text{e.g., } \frac{2\pi}{24} \div 2 \text{ ms} \div \frac{\pi}{24} \text{ rads/ms}\right).$$

This yields a per second rotational speed of $$\frac{125}{3}\pi$$

rads/sec, which, when converted to RPM yields approximately 1250 RPM. As should be understood, this example rotational speed is well short of the desired approximately 4,000 to 10,000 or more RPM desired for certain applications, such as drone motors.

Figure 4A:
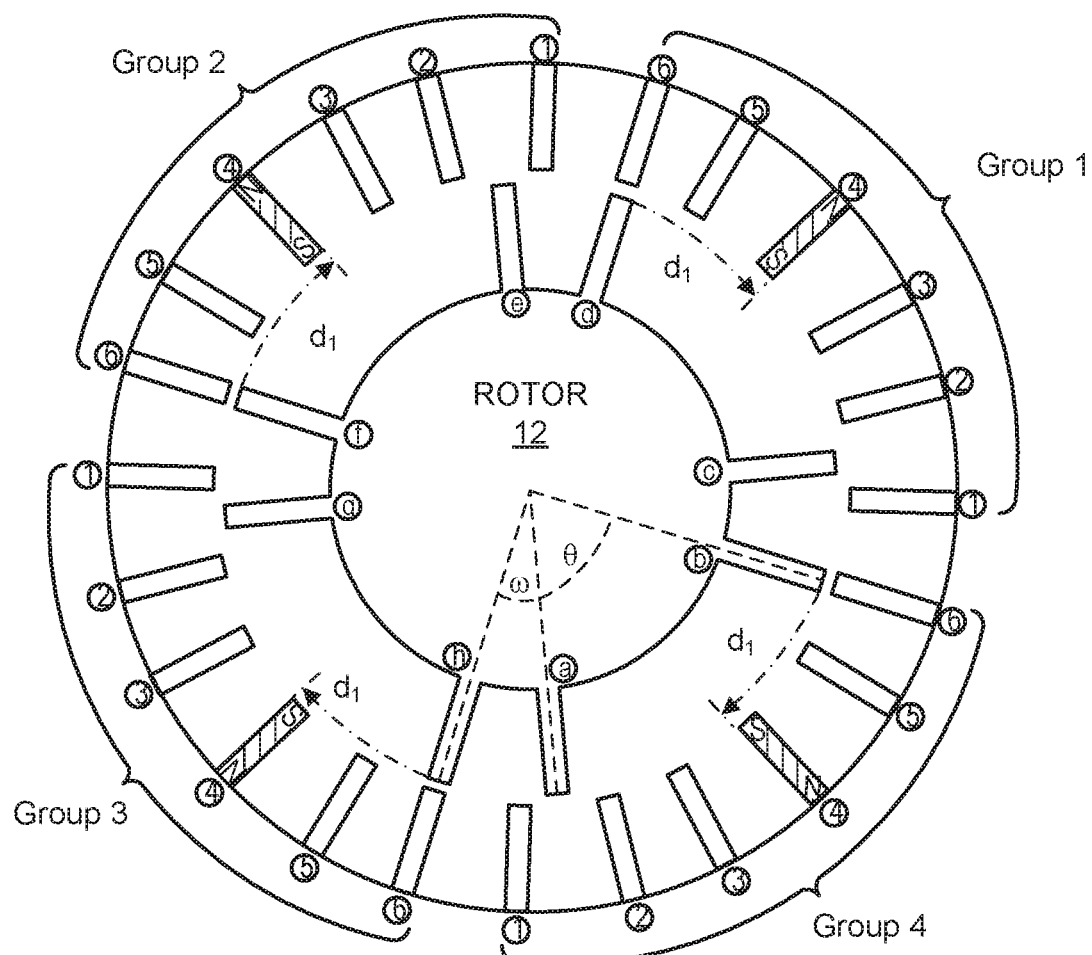
FIGS. 4A and 4B are illustrations of an embodiment of a rotor with non-angular teeth spacing and a stator.
Figure 4B:
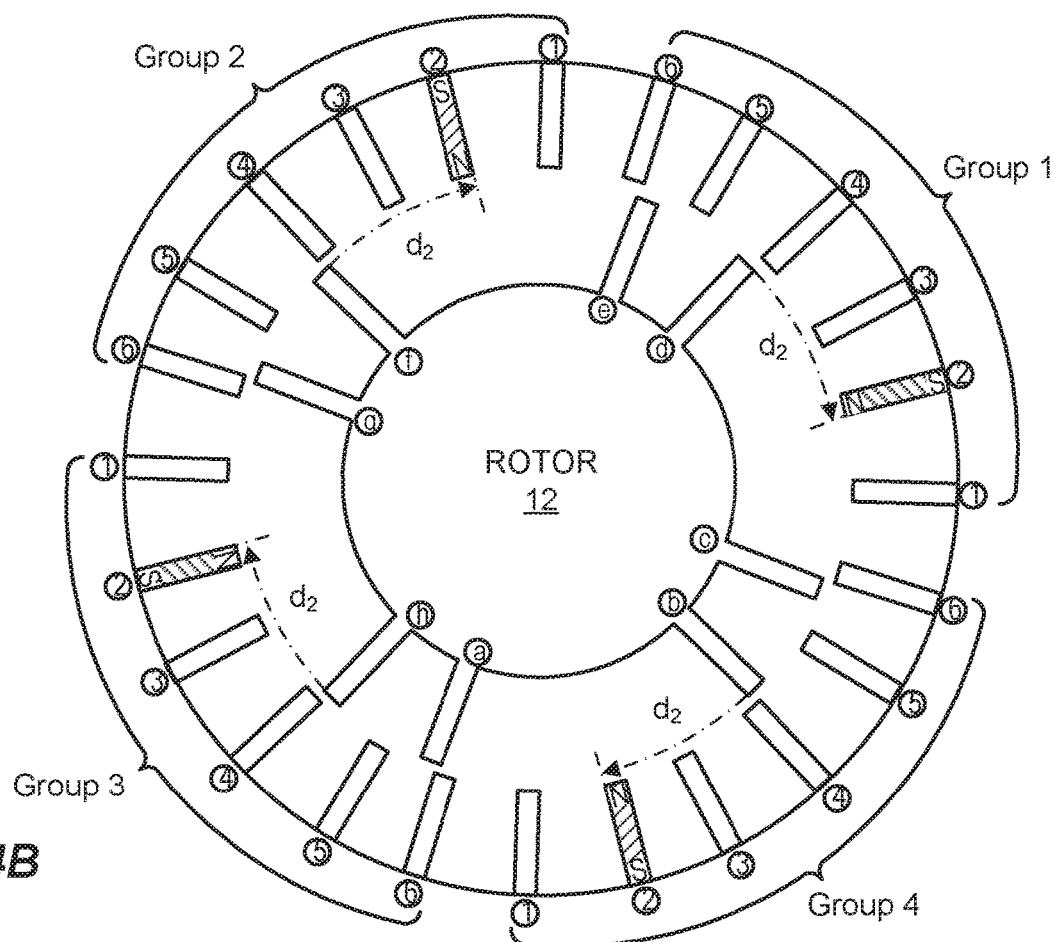

As mentioned above, rather than having a traditional uniform angular spacing of rotor teeth, in one electric motor embodiment, rotor 12 may have a non-uniform angular spacing of rotor teeth, such as to achieve desired rotational speed (e.g., and still be able to have a desired power density and torque output at the desired rotational speed). FIG. 4A is an illustration of a rotor with non-uniform angular spacing of rotor teeth. As used to herein, non-angular spacing refers to differing angular separation between adjacent rotor teeth. For example, FIG. 4A shows an embodiment having an angular spacing between rotor teeth a and b that is θ, while an angular spacing between rotor teeth h and a is ω, where θ≠ω. Non-uniform angular spacing may be thought of in terms of a ratio of separation between rotor teeth due to one angular spacing or separation between rotor teeth as compared to a second angular spacing (e.g., θ:ω). While FIG. 4A illustrates an embodiment having an angular spacing of approximately 3:1 (e.g., the angle θ is approximately 3 times the angle ω), other non-uniform angular spacing ratios may be used including, but not limited to 2:1, 2.5:1, 3:1, 3.5:1, 4:1, 5:1, etc. Using a non-uniform angular spacing may allow a rotor to rotate more radians per cycle, of the electric motor. Indeed, as shown in FIG. 4A, one or more current pulses may be driven through one or more coil windings wrapped about a stator tooth number 4 in group number 4 of stator 14. The one or more current pulses may generate an EMF, which may provide a torque, such as in the form of an attractive force, on rotor tooth b of rotor 12. In response to the torque, rotor 12 may rotate an angular distance θ (e.g., such that a point at the extremity of rotor tooth b moves a length along an arc of rotation $d_1$). FIG. 4B illustrates a subsequent point at which four other stator teeth, stator teeth 2 of group numbers 1-4, engender an EMF with certain rotor teeth (e.g., rotor teeth b, d, f, and h, by way of example) to provide a torque on rotor 12.

In addition to thinking of non-uniform angular spacing ratios, it may also be instructive to think of non-uniform angular spacing in terms of a ratio of stator teeth to rotor teeth. For example, the embodiment illustrated in FIGS. 3A-3C comprises a stator tooth to rotor tooth ratio of 3:2. While this arrangement may offer high torque output and high power density, due at least in part to the large number of poles (e.g., 24), the electric motor implementation may not be able to rotate at desired RPMs. In contrast, as shall be discussed in further detail hereinafter, by selecting a stator tooth to rotor tooth ratio of 3:1 may allow the electric motor to operate at higher RPMs than the embodiment in FIGS. 3A-3C.

In one implementation, rotational speed may also be increased by alternating torque pulses from different charge sources as shall be discussed in greater detail hereinafter.

As opposed to the embodiment illustrated in FIG. 3A-3C in which eight stator teeth provide a torque to rotor 12 at a given time, the embodiment in FIGS. 4A and 4B provides a torque to rotor 12 using four stator teeth. Thus, the power density for any given torque is only 4P as compared to the power density of 8P of the embodiment of FIGS. 3A-3C. Thus, the power density in a non-uniform angular spacing implementation may be approximately half of that of a traditional electric motor in one implementation. However, in contrast, the rotational speed may be approximately four to five times that of the traditional approach. Indeed, for every charge/discharge cycle of coil windings, charge storage devices, and/or switching of switch S, a rotor tooth may travel an angular distance of approximately θ/2 or $$\frac{\pi}{6} \text{rads}$$

(e.g., an arc length of approximately $d_1$). Additionally, in one implementation, charge/discharge of coil windings may be coordinated, such as to at least partially overlap, in order to induce increased angular rotation in a unit of time. For instance, looking at FIGS. 4A and 4B, if a charge up of a coil winding wrapped around stator tooth 2 of group number 4 is coordinated to occur during a discharge of a coil winding wrapped around stator tooth 4 of group number 4, it may be possible for rotor 12 to rotate by approximately θ or $$\frac{\pi}{3} \text{rads}$$

during the 2 ms charge/discharge cycle. Thus, the rotational speed of rotor 12 may be approximately 3.5-4 or more times greater than that of a uniformly spaced rotor tooth embodiment. As such, rotor 12 may rotate at approximately 4375 or more RPM. It will be appreciated, then, that non-uniform angular spacing of rotor teeth may be advantageous in some cases, such as when a higher rotational speed is desired.

Figure 5:
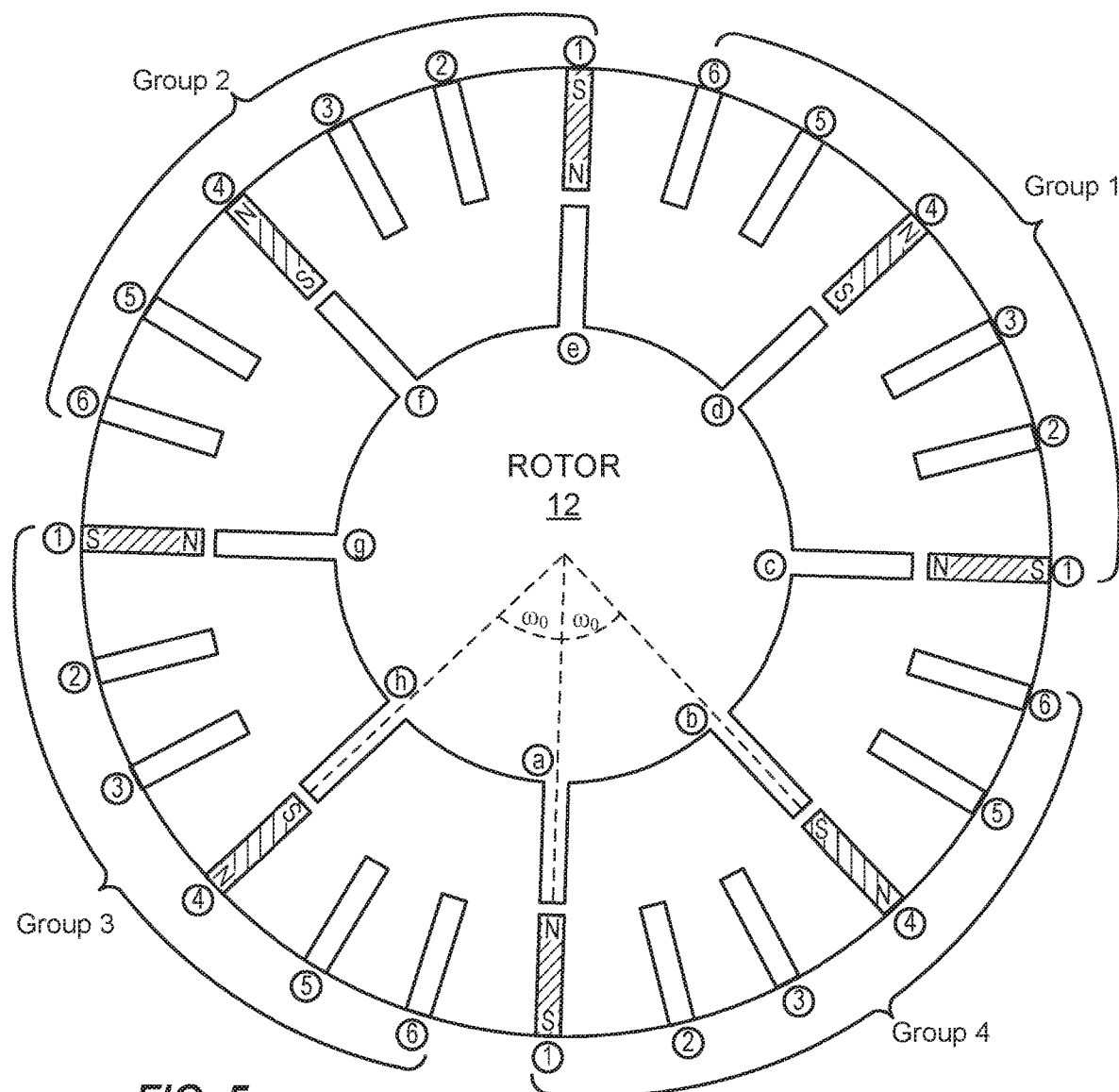
FIG. 5 is an illustration of an embodiment of a rotor and stator.

To further illustrate an advantage of a rotor with non-uniform angular spacing, an embodiment is presented in FIG. 5 in which rotor teeth are spaced with uniform angular spacing between any two given rotor teeth. For instance, FIG. 5 shows that the angular spacing between rotor teeth a and b is coo and the angular spacing between rotor teeth h and a is also coo. However, because the angular spacing of rotor teeth in is uniform, and also because of the larger spacing between rotor teeth, it may be possible, as illustrated, for all rotor teeth to be aligned with stator teeth at a given time. In this context, alignment of stator and rotor teeth refers to a positioning of a rotor tooth relative to a stator tooth such that an EMF generated on the stator tooth interacts approximately equally on opposing surfaces of the rotor tooth. For instance, a first portion of the generated EMF may exert a force on a first portion of the rotor tooth approximately equal in magnitude but opposite in direction to a second portion of the generated EMF on a second portion of the rotor tooth. As such, the generated EMF may not be able to provide a torque to the rotor tooth. In the embodiment illustrated in FIG. 1A in which coil windings are wrapped about external surfaces of stator teeth, a rotor tooth may be aligned with a stator tooth if an end face of the rotor tooth faces an end face of the stator tooth and an axis running from the center of the rotor core through a central axis of rotor tooth also runs approximately through a central axis of the stator tooth.

The uniform angular spacing embodiment of FIG. 5 may be contrasted with the embodiment in FIGS. 3A-3C in which, due at least partially to the greater number of rotor teeth (and, consequently, the smaller spaces between rotor teeth), a plurality of teeth of rotor 12 may not be aligned with stator teeth at any given time. If all rotor teeth are in an aligned position with corresponding stator teeth, as is the case in FIG. 5, then it may not be possible for generated EMFs to facilitate rotation of rotor 12. Indeed, in the embodiment of FIG. 5, if current were driven through coil windings of stator teeth 1 of group numbers 1-4 to attempt to impart rotation on rotor 12, rather than rotating, the generated EMF may bind rotor 12. In implementations for which it may be possible for all rotor teeth to be aligned at a same time, it may not be possible to provide a torque and initiate rotation rotor 12 from a starting position, for example. As should be apparent, a non-uniform angular spacing of rotor teeth may be desirable, such as to avoid situations in which all rotor teeth are aligned with stator teeth at a same time.

Additionally, it is noted that in the embodiment of FIG. 5 there may be, by virtue of a uniform angular spacing of rotor teeth, a smaller separation or gap between rotor teeth. For ease in comparison, angular spacing may be thought of in terms of a number of stator teeth that may fit between axes of adjacent rotor teeth. For instance, FIG. 4A shows axes traversing rotor teeth a and b, and further shows that approximately 4.5 stator teeth may fit into the angular spacing between the axes of rotor teeth a and b (e.g., if rotor 12 is rotated slightly). And in contrast to the angular spacing of FIG. 4A, in the uniform angular spacing embodiment of FIG. 5, the angular separation between rotor teeth a and b is such that approximately 3 or fewer stator teeth may be arranged between the axes of rotor teeth a and b. As should be appreciated, there is a relationship between angular spacing of rotor teeth and rotational speed. Indeed, in particular implementations as angular spacing between rotor teeth increases, so may rotational speed. Consequently, a non-uniform angular spacing of rotor teeth may also be desirable, such as to achieve a higher rotational speed.

Alternatively, a separation between adjacent rotor teeth may be thought of in terms of an arc length between an extremity of an interior surface of a rotor tooth (e.g., rotor tooth b in FIG. 4A) to an adjacent interior surface of an adjacent rotor tooth (e.g., rotor tooth a in FIG. 4A). For example, FIG. 4A shows a partial arc between rotor teeth a and b. A measure of this arc length may provide a mechanism for comparing angular spacing and, in the context of non-uniform angular spacing, such as in FIG. 4A, may provide insight and an ability to compare one angular spacing of a rotor with another. Thus, for example, in one implementation, it may be determined, such as based on differing arc length, that an angular spacing between rotor teeth a and b in FIG. 4A is different from an angular spacing between rotor teeth a and h in FIG. 4A. Likewise, this method of comparing angular spacing may also render possible the determination that, for instance, in FIG. 5, the angular spacing coo between rotor teeth a and b is not different from the angular spacing coo between rotor teeth a and h. Thus, comparisons of angular spacing, given in terms of arc lengths may also be expressed as ratios. For instance, in a non-uniform implementation, such as in FIG. 4A, a ratio of one angular spacing to another may be 4.5 to 1. Of course, other ratios are contemplated by the present disclosure, including, but not limited to 2:1, 2.5:1, 3:1, 3.5:1, 4:1, 5:1, etc.

With the foregoing in mind, it may be desirable to arrange teeth of rotor 12 such that angular spacing between rotor teeth may not yield completely aligned rotor teeth. For example, referring to rotor teeth a and h in FIG. 4A, it is noted that when rotor tooth h is aligned with stator tooth 6 of group number 3, rotor tooth a is not aligned with either stator tooth 1 or 2 of group number 4, nor is rotor tooth g aligned with either stator tooth 1 or 2 of group number 3. It should be apparent, therefore, that angular spacing of rotor teeth should be selected based, at least partly, on design criteria including, but not limited to, stator tooth spacing, desired RPM, etc.

Figure 6:
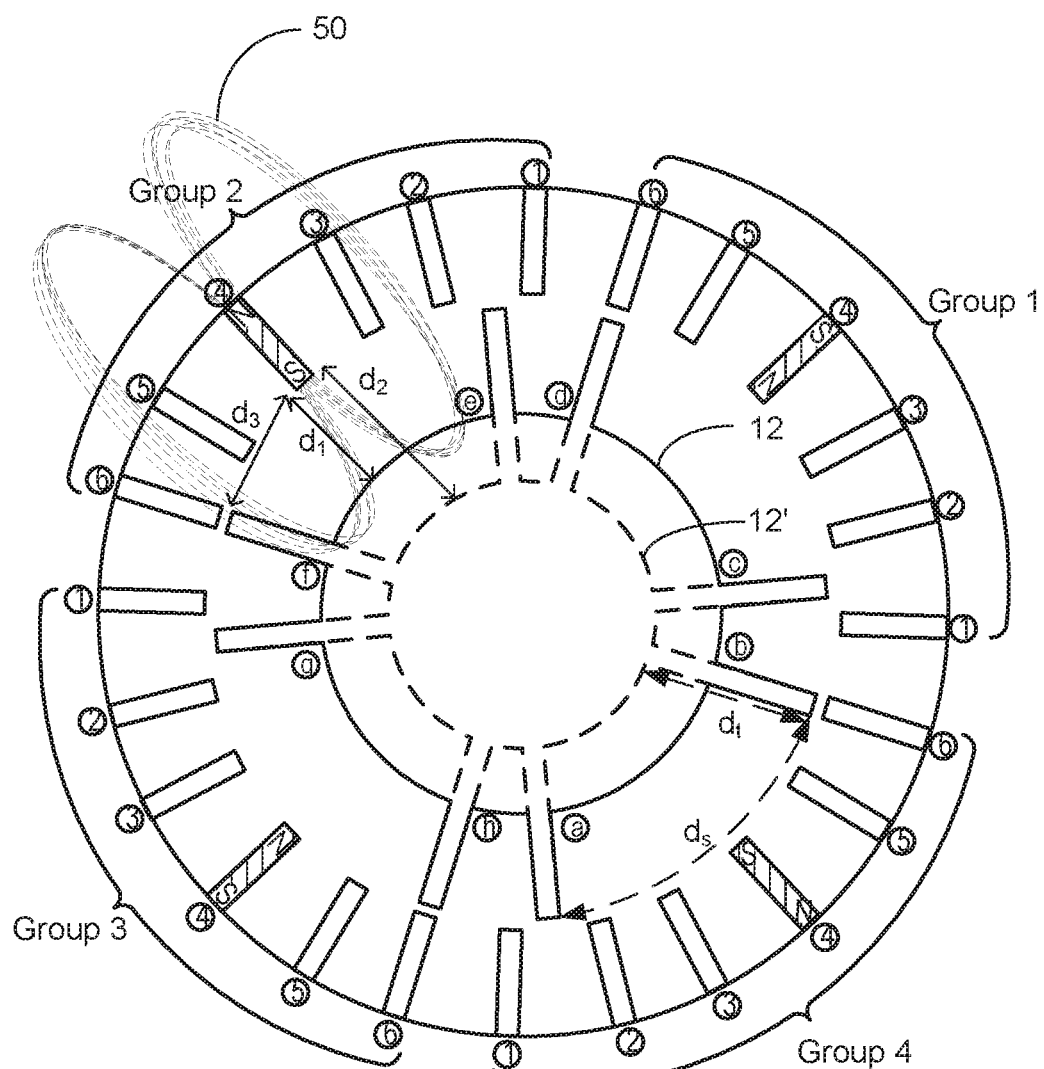
FIG. 6 is an illustration of an embodiment of a rotor and stator.

Selection of rotor trench depth may also contribute to rotational speed. FIG. 6 illustrates an example electric motor having non-uniform angular spacing of rotor teeth. A rotor 12 is illustrated with solid lines and an alternative rotor 12' is superimposed, merely for convenience of illustration, using broken lines. As shall be shown, selection of a rotor may also take into consideration, magnitude of EMF generated on a given stator tooth. Indeed, an example EMF, EMF 50, generated on stator tooth 4 of group number 2 is illustrated using force lines. A number of distances are also shown in FIG. 6. For instance, a first distance, $d_1$, is shown between an extremity of stator tooth 4 of group number 2, and a core of rotor 12. In comparison, a second distance, $d_2$, is shown between the extremity of stator tooth 4 of group number 2, and a core of rotor 12'. Additionally, a distance $d_3$ is shown between stator tooth 4 of group number 2 and rotor tooth f. These distances will serve to illustrate selection and/or arrangement of a rotor.

In one embodiment, one or more current pulses may be driven through one or more coil windings of a stator tooth, such as stator tooth 4 of group number 2. The current pulses may engender an EMF, such as EMF 50. In some cases, EMF 50 may have a tendency to attempt to interact with a nearest structure. As such, in one embodiment, EMF 50 may attempt to apply a torque to a core of rotor 12 rather than rotor tooth f. In order to facilitate EMF interaction with rotor teeth rather than a rotor core, it may be desirable to select a rotor profile, such as that of rotor 12', in which a distance, $d_2$, between a stator tooth and the rotor core may be greater than a distance, $d_3$, between a stator tooth and adjacent rotor teeth. As used herein, the term trench depth refers to the distance between an extremity of a rotor tooth and the rotor core, such as approximated by distance $d_t$ in FIG. 6. Thus, in one embodiment of an electric motor, rotor 12' may be selected with a trench depth sufficient to reduce EMF interaction with a core of rotor 12' relative to the EMF interaction with rotor 12.

As noted above, selection of trench depth may be based at least partly on magnitude of EMF to be generated on a stator tooth. However, in some implementations, a suitable trench depth may be determined by selecting a trench depth, $d_t$, greater than or equal to ½ an arc length between adjacent rotor teeth of a largest angular spacing of a rotor, as shown by $d_s$ in FIG. 6. This relation may be expressed as:

$$d_1 \geq \tfrac{1}{2} d_s$$

Figure 7:
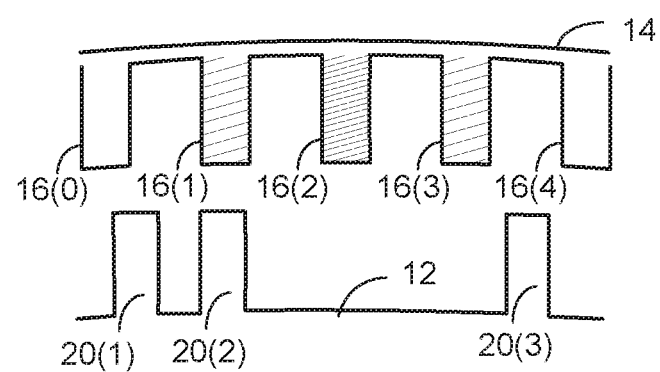
FIG. 7 is an illustration of an embodiment rotor and stator.

Additionally, at least because, as noted above, an EMF may tend to interact with a closest structure, in some cases EMF 50 may attempt to interact with adjacent stator teeth (e.g., stator teeth 3 and 5 of group number 2) rather than a rotor tooth, such as rotor tooth f. It may be desirable to configure one or more parts or portions of an electric motor to cause EMF 50 to interact with rotor teeth rather than stator teeth. In one embodiment, this may be accomplished by engendering partial EMFs on adjacent stator teeth. For example, FIG. 7 illustrates a subset of rotor and stator teeth and uses slanted lines to indicate stator teeth through which one or more current pulses may be driven, such as to engender an EMF. The closeness of the slanted line pattern may indicate different EMF magnitude.

For example, FIG. 7 shows a stator tooth 16(2), that may be usable such as to provide a torque to a rotor tooth, such as rotor tooth 20(2). However, because a distance between stator tooth 16(2) and rotor tooth 20(2) may be greater than a distance between stator teeth 16(2) and 16(1), an EMF generated on stator tooth 16(2), such as by applying current of a desired level through a coil winding of stator tooth 16(2), may interact with stator teeth 16(1) and 16(3) instead of rotor tooth 20(2). It may thus be desirable to do cause an EMF of stator tooth 16(2) to interact with rotor tooth 20(2).

In one embodiment, generating an EMF on adjacent stator teeth, such as stator teeth 16(1) and 16(3) may facilitate interaction of the EMF on stator tooth 16(2) with rotor tooth 20(2). For example, if an EMF is engendered on stator teeth 16(1) and 16(3) and is approximately half of that of stator tooth 16(2), then the EMF on stator tooth 16(2) may provide a torque to rotor tooth 20(2) rather than interacting with stator teeth 16(1) or 16(3). For instance, the adjacent EMFs of lesser magnitude may be such that the EMF on stator tooth 16(2) may not tend to interact with adjacent stator teeth 16(1) and 16(3).

In one implementation, it may be possible to create a flowing wavefront, such as with one or more DC current pulses. A flowing wavefront refers to a group of stator teeth with EMF of varying magnitudes (e.g., stator teeth 16(1), 16(2), and 16(3) of FIG. 7) and in which the EMF wave travels around a stator to simulate a wave. Table 1, below, illustrates how one such stator and rotor combination implementation of a flowing wavefront may operate. Table 1 includes values that represent example EMF magnitude levels at different times $t_i$. The magnitude of EMF generated on a stator tooth is denoted as an arbitrary unit value for ease of explanation.

TABLE 1

| Time $t_i$ | 16(0) | 16(1) | 16(2) | 16(3) | 16(4) |
|---|---|---|---|---|---|
| $t_0$ | 0 | .5 | 1 | .5 | 0 |
| $t_1$ | 0 | 0 | .5 | 1 | .5 |
| $t_2$ | .5 | 0 | 0 | .5 | 1 |

In one embodiment, it may be possible to establish a flowing wavefront along stator teeth of stator 14, such as with DC pulses. For instance, at a first time $t_0$, an EMF may be formed on stator tooth 16(2) for providing a torque to rotor 12, such as by pulsing current through a coil winding wrapped around stator tooth 16(2). At time $t_0$, an EMF previously formed on an adjacent stator tooth 16(1) may be decreasing over a time period comprising time to and equal approximately one half the magnitude of the EMF formed on stator tooth 16(2). At time $t_0$, another adjacent stator tooth, stator tooth 16(3), may be prepared for a subsequent EMF pulse, such as to provide a torque to a rotor tooth, and current may begin to be transmitted through a coil winding of stator tooth 16(3). Thus, at time $t_0$, an EMF formed on stator tooth 16(3) may have a magnitude equal to approximately one half the EFM formed on stator tooth 16(2). Thus, at time $t_0$, an EMF formed on stator teeth 16(1) and 16(3), adjacent to stator tooth 16(2), may be approximately half the magnitude of the EMF generated on stator tooth 16(2). The approximately half magnitude EMF on stator teeth 16(1) and 16(3) surrounding stator tooth 16(2) may be such that the EMF formed on stator tooth 16(2) may interact with rotor tooth 20(2) rather than adjacent stator teeth 16(1) and/or 16(3). The interaction between the EMF of stator tooth 16(2) and rotor tooth 20(2) may provide a torque and cause rotor 12 to rotate relative to stator 14.

At a subsequent time $t_1$, the EMF on stator tooth 16(1) may have all but disappeared, the EMF on stator tooth 16(2) may be decreasing over a time period including $t_1$ (e.g., and may equal approximately half of its EMF at time $t_0$), and the EMF on stator tooth 16(3) may equal approximately twice its magnitude at $t_0$. Additionally an EMF may be generated on stator tooth 16(4), such as by driving one or more current pulses through a coil winding wrapped around stator tooth 16(4), and may have a magnitude of approximately one half of that generated on stator tooth 16(3). Thus at time $t_1$ the magnitude of EMF on stator teeth 16(2) and 16(4) may be approximately half the magnitude of EMF on stator tooth 16(3). As such, the EMF generated, such as by pulsing current through a coil winding wrapped around stator tooth 16(3), may interact with rotor tooth 20(2), such as to provide a torque to rotor 12.

And at a subsequent time, $t_2$, the EMF on stator tooth 16(2) may have all but disappeared, the EMF on stator tooth 16(3) may be decreasing over a time period including $t_2$ and may be approximately one half of its magnitude at time $t_1$, and the EMF on stator tooth 16(4) may have a magnitude of approximately twice that of time $t_1$. Additionally, an EMF may be increasing over the time period on another adjacent stator tooth (e.g., a stator tooth 16(5) not shown in FIG. 7). Thus, with EMF magnitudes of approximately half that of the EMF on stator tooth 16(4), the EMF on stator tooth 16(4) may interact with rotor tooth 20(2), such as to provide a torque to rotor 12. Additionally, in an embodiment such as that in FIGS. 4A and 4B, at a time $t_2$, stator tooth 16(0) may begin charging up and may have an EMF of approximately half that of stator tooth 16(4).

The wavefront-like behavior explained with reference to FIG. 7 and Table 1 may continue as EMF is generated on subsequent stator teeth. In one embodiment, both positive and negative magnitudes may be used in order to provide one or more torques to a rotor 12. For instance, referring to FIG. 6, an EMF of a first magnitude and a first orientation (e.g., with a S pole closest to rotor 12) may be formed on stator teeth 4 of group numbers 2 and 4 while an EMF of a second magnitude and a second orientation (e.g., with an N pole closest to rotor 12) may be formed on stator teeth 4 of group numbers 1 and 3. Also, half magnitude EMFs may be formed on adjacent stator teeth (e.g., stator teeth 3 and 5 if stator tooth 4 is to be used to provide a torque to rotor 12). Of course, this is but one example of possible ways in which torque may be provided to rotor 12.

In one implementation, it may be desirable to coordinate torque pulses, such as via generated EMF. For instance, at a first time, an EMF may be generated on two or more stator teeth, and a subsequent time, an EMF may be generated on two or more other stator teeth, etc. Coordinated torque pulses may operate cumulatively, such as to provide torque pulses of a desired output power. Additionally, such as to achieve efficient operation, charge driven through a coil winding of a stator tooth may be recaptured for reuse at a subsequent time. FIGS. 2A-2C illustrate an embodiment of an electric motor arrangement in which charge may be captured and reused at subsequent times. Torque pulses based, at least in part, on captured and reused charge may be used in conjunction with other torque pulses, such as to contribute to a rotational speed of a rotor. For example, while charge used to generate an EMF is driven into a charge storage device, such as charge storage device C in FIGS. 2A-2C, charge may be driven from a power source on different stator teeth 16 to generate additional torque pulses. Thus, charge and/or discharge cycles may overlap to some degree to further increase rotational speed. For example, referring to FIG. 4A, near an end of a torque pulses in which charge is driven through coil windings wound about stator teeth 4 of group numbers 1, 2, 3, and 4 and in to respective charge storage devices, charge may be driven from charge storage devices corresponding to stator teeth 2 of group numbers 1-4 to produce additional torque pulses, as shown in FIG. 4B.

FIG. 1A is an illustration of an example electric motor 10 having a rotor 12 and a stator 14. Rotor 12 may have a plurality of rotor teeth, of which rotor teeth 20a and 20b are indicated by way of non-limiting example in FIG. 1A. Stator 14 may have a plurality of stator teeth, such as stator tooth 16, which is shown below the drawing of electric motor 10 for ease of illustration. Stator teeth 16 may comprise one or more coil windings 18. It is to be understood that while only a single stator tooth 16 is shown with a coil winding 18, this is done merely to enhance the readability of the drawing. Similarly, element numbers are not provided for each rotor and stator tooth for readability. It is to be understood that, for example, stator tooth 16, coil winding 18, and/or rotor tooth 20 is discussed hereinafter, the designation may apply to any relevant stator tooth, coil winding, and/or rotor tooth, respectively, as appropriate, based on the context of the description.

As illustrated, in one embodiment, electric motor 10 may comprise a controller 24, a driver 22, and/or a supply 26. The arrows between stator 14, controller 24, driver 22, and/or supply 26 indicate electric coupling between components of electric motor 10, via which signals may be transmitted and/or received. For example, in one embodiment, a processing element of controller 24 may be capable of transmitting one or more signals to stator 14, such as via driver 22, to provide one or more current pulses through coil winding 18, such as to provide a torque on rotor 12. Among other things, controller 24 may manage timing, monitor rotor orientation, and control rotational speed of rotor 12, among other things. Driver 22 may be electrically coupled to controller 24 and may transmit one or more current pulses to coil windings of stator 14. In some embodiments, driver 22 may be capable of recapturing and reusing energy as discussed briefly hereinafter.

One implementation of an electric motor capable of recapturing and reusing charge is illustrated in FIGS. 2A-2C and comprises a simplified arrangement of parts of an electric motor, such as electric motor 10 of FIG. 1A. The example arrangement in FIG. 2A may be capable of driving a current $I_1$ from a power source PS through a coil winding 18. Power source PS may correspond to supply 26 illustrated in FIG. 1A. Changes in current, such as $I_1$, through coil winding 18 may induce an electromagnetic force. If a switch S is closed, as shown in FIG. 2A, current $I_1$ may drive charge into a charge storage device C. Charge storage device C represents a device, such as a capacitor, capable of holding a charge. In one embodiment, charge stored in charge storage device C may be transmitted back through coil winding 18, such as in a subsequent motor cycle.

Switches usable in drivers 22 may operate as conducting elements, such as FETs, to permit current to pass between source and drain terminals based, at least in part, on a voltage applied to a gate terminal. It should be understood, however, that other types of devices such as a bipolar transistor, thyristor, diode, variable resistor, etc. may be used as a conducting element, and that claimed subject matter is not limited in this respect. In this context, a switch may comprise a conducting element having first and second terminals that may form a connection between the first and second terminals by providing a conductive path between the first and second terminals having a very small or negligible impedance for a particular signal. In one particular example implementation, a conductive element may vary in impedance between the first and second terminals based, at least in part, on a signal provided to a third terminal of the conductive element (e.g., based on a voltage or current applied to a third terminal). In one aspect, a conductive element may "close" to thereby connect first and second terminals in response to a signal provided on the third terminal. Likewise, a conductive element may "open" to thereby disconnect first and second terminals in response to a different signal provided on the third terminal. In one aspect, a conductive element in an open state may isolate a first portion of a circuit from a second portion of the circuit by removing or disrupting a conductive path between the first and second portions of the circuit. In another aspect, a conducting element may vary an impedance between first and second terminals between opened and closed states based on a signal provided to a third terminal.

FIG. 2B illustrates a voltage $V_1$ across terminals of charge storage device C. Voltage $V_1$ may reflect charge, such as from current $I_1$, stored in charge storage device C. While in some embodiments a charge storage device C, such as a capacitor, may attempt to discharge or transfer stored charge back into the circuit, opening switch S may serve to hold stored charge in charge storage device C. Thus, by opening switch S, charge, such as represented by $V_1$ across terminals of charge storage device C, may be held in charge storage device C. As such, it may be possible to achieve a desired efficiency by capturing charge, such as in charge storage device C, to be used in later cycles of an electric motor.

Further, as should be apparent, in one implementation it may be possible to control charge and discharge of charge storage device C, such as by opening and closing switch S. FIG. 2C illustrates charge being driven from the charge storage device through coil winding 18 in the form of $I_2$. In one embodiment, by closing switch S, charge may be driven back through coil winding 18, a second electromagnetic force may be generated on coil winding 18 which may engender rotation of a rotor. Thus, efficient operation of an electric motor, may be achieved by capturing charge for use in subsequent cycles using a charge storage device and/or a switch, by way of non-limiting example.

In one embodiment, the charge making up $I_2$ may be driven back to power source PS. The charge may be captured, such as by storing the charge in a battery or other charge storage device, and reused, such as by adding it to a subsequent current pulse to be driven through coil winding 18.

TABLE 2

| Time $t_i$ | Charge in volts (V) | | |
|---|---|---|---|
| | PS | 18 | C |
| $t_0$ | $V_1$ | 0 V | 0 V |
| $t_1$ | 0 V | $V_1$ | 0 V |
| $t_2$ | 0 V | 0 V | $V_2$ |
| $t_3$ | 0 V | $V_2$ | 0 V |
| $t_4$ | $V_1 + V_3$ | 0 V | 0 V |

Table 2, above, illustrates operation of an example coil winding 18 and driver (e.g., a driver of drivers 22) comprising a switch S and a charge storage device C at a plurality of times $t_i$. It is noted that the column labeled PS refers to charge driven from a power source PS and not necessarily a total charge stored in a power source PS. Thus, power source PS may transmit discrete portions of charge that it stores to coil winding 18. At a first time $t_0$, charge may be driven from power source PS to coil winding 18, as illustrated in FIG. 2A. A first voltage $V_1$ may be generated across a terminal of power source PS and a terminal of coil winding 18, as shown in Table 2. At a second time $t_1$, the charge may be driven through coil winding 18, as shown by the first voltage $V_1$ across terminals, as shown in Table 2. Driving charge through coil winding 18 may engender an electromagnetic field that may be capable of providing a torque on a rotor tooth (e.g., rotor tooth 20a or 20b in FIG. 1A) in proximity to stator tooth 16.

Subsequent to time $t_1$, coil winding 18 may attempt to drive charge toward a charge storage device C, such as a capacitor, by way of non-limiting example. The charge driven from coil winding 18 may traverse switch S, which may be in a closed position, thus allowing charge to travel from one of its terminals to a second one of its terminals, and on to charge storage device C. It may be desirable to hold charge in charge storage device C, such as for timing, and thus switch S may be opened. As such, in one embodiment, charge stored in charge storage device C may be maintained until desired, such as to provide a torque on a rotor 12. FIG. 2B illustrates a third time, $t_2$, at which switch S is in an opened position and a voltage $V_2$ (e.g., where $V_2 \approx -V_1$, as charge may be lost during transmission from power source PS, via coil winding 18, to charge storage device C, among other things) may be measured across terminals of charge storage device C.

As illustrated in FIG. 2C, at a fourth time $t_3$, switch S may be placed in a closed position, thus allowing charge to be transmitted from charge storage device C, such as shown by $I_2$, back through coil winding 18. Thus, a voltage $V_2$ may be measured across coil winding 18. It may be desirable in some cases, to transfer the charge back into power source PS (e.g., a battery), such as for subsequent cycles or phases. As such, at a subsequent time, $t_4$, the charge received from charge storage device C may be combined with further charge, as shown by $V_1 + V_3$ in Table 2, such as for efficient operation.

It should be understood that two or more coil windings may be logically paired to engender electromagnetic field pulses at approximately a same time. Thus, at time $t_1$, as a first coil winding 18 generates a first electromagnetic force responsive to charge transmitted from a power source PS, a second coil winding 18 may generate a second electromagnetic force responsive to charge transmitted from a charge storage device C. Thus, the net power from power source PS used for the first and second electromagnetic forces from the power source PS is the power for the first electromagnetic force minus the power for the second electromagnetic force, based at least partly on charge from charge storage device, which may be transmitted back to power source PS. It should be understood that such operation may offer significant efficiency improvements over prior approaches.

Due at least partly to efficiency of recaptured charge, aluminum (Al) coil windings may be used instead of copper (Cu) coil windings in at least one embodiment. While Cu coil windings may tend to conduct charge more efficiently than Al coil windings, Al coil windings may weigh less than Cu coil windings. As such, by being able to recapture and reuse charge, potential inefficiencies in Al coil windings may be offset by efficient operation and lighter coil windings. For at least this additional reason, it may be desirable to recapture and reuse charge.

As shown, then, in some cases it may be desirable to recapture energy transmitted through coil winding 18, as the recaptured energy may render electric motor 10 more efficient. However, rather than wrapping a single coil winding 18 about stator tooth 16, in one implementation, a plurality of coil windings may be used, such as is shown by first coil winding 18a and second coil winding 18b in FIG. 1B. For example, there may be a desire for a relatively inexpensive and/or simple way of operating electric motors at low voltages. One approach may comprise transforming a low voltage, such as from a battery, to a higher voltage to drive an electric motor. FIG. 2D illustrates a simple transformer comprising a mutually inductive coil winding pair. As shown, an oscillator (e.g., an AC power source) may drive a current $I_p$ through a primary coil winding 8a. Of course, transformers operate consistently with the law of conservation of energy and Faraday's law of induction, such that a power on first mutually coupled coil winding 8a is equal to a power on second coil winding 8b of the mutually coupled inductive pair, represented as $P = I_p V = I_s V_s$. According to Faraday's law, there is a relationship between the number of turns of the coil winding and the induced voltage. As such, it may be possible to induce a desired voltage and/or current on second coil winding 8b by selecting an appropriate coil, such as with an appropriate number of turns. For example, Faraday's law of induction provides that a voltage for a wound coil may be represented as $$V = -N\frac{d\Phi}{dt},$$

where N refers to a number of turns of a coil winding and dΦ refers to a change in magnetic flux. In other words, a voltage on a coil winding may be proportional to a change in magnetic flux. Additionally, Lenz's law provides that changes in current on one coil winding of a mutually coupled coil winding pair, may be opposed by current induced on the other coil winding of the pair. Thus, changes in $I_p$ in primary coil winding 8a may induce an electromagnetic field. In response, an opposing electromagnetic field may be induced on secondary coil winding 8b, which may generate a current $I_s$, which is opposite in direction to that of $I_p$. And because, as noted, if second coil winding 8b comprises more coil turns than primary coil winding 8a, a step-up effect may be created wherein a lower voltage $V_p$ may generate a greater voltage $V_s$ on the secondary coil winding 8b. Furthermore, it may be desirable to, rather than using a separate transformer, enable the coils of an electric motor to act as a step up transformer.

According to an embodiment, a change in a current through a coil winding on a stator tooth may induce a magnetic force, creating a torque to drive a motor. In a particular implementation, a stator tooth may comprise two coil windings, a first coil winding to receive a signal from a power supply and a second coil winding to generate the magnetic force creating the torque. It may be desirable to enable yet further efficiency in electric motor operation by capturing and/or reusing the current generated on the second coil winding. In one embodiment, this may be achieved by allowing stored charge to oscillate through the second coil winding. Responsive to changes in current through the second current from oscillation of the stored charge, the second coil winding may induce a magnetic force to create the torque. For instance, the second coil winding may be arranged relative one or more charge storage devices (e.g., capacitors) to form a resonance circuit capable of maintaining an oscillating current to induce an electromagnetic field. In a particular implementation, one or more switches may be used in a driver circuit to, among other things, facilitate control of timing of oscillations of current through the second coil winding. In particular implementations, the first and second coil windings on the stator tooth form a mutually inductive pair such that the first coil winding may, in response to a power signal, generate a magnetic field inducing a current in the second coil winding. The driver circuit may synchronize the induced current in the second coil winding and add it to current in the second coil winding from the oscillating charge.

Figure 1B:
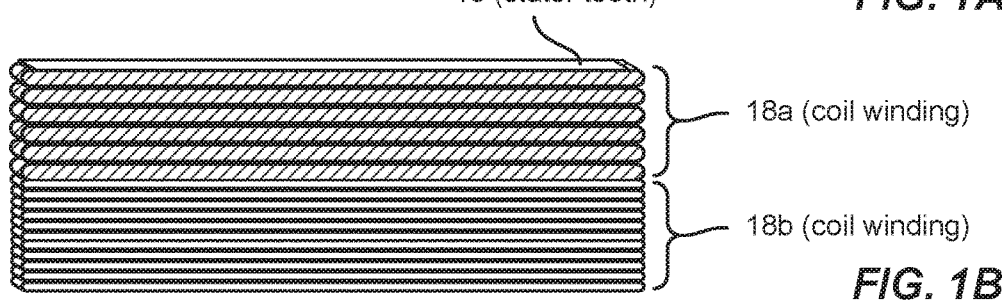
FIG. 1B is an illustration of a stator tooth with a split coil winding.

In one embodiment, a first coil winding 18a and a second coil winding 18b may be wound about a stator tooth 16 as illustrated by FIG. 1B. FIG. 2E illustrates a resonance circuit embodiment to demonstrate particular operation of particular features of first and second coil windings 18a and 18b according to an embodiment of stator tooth 16 and a simple driver circuit, such as may be used to apply torque to a rotor. A magnetic force may be induced responsive to changes in current through second coil winding 18b. The induced magnetic force may apply a torque to one or more rotor teeth (e.g., rotor tooth 20a or 20b in FIG. 1A). Additionally, energy that is not used or lost in inducing the magnetic field may be captured in a charge storage device, such as a capacitor. Charge storage devices C1 and C2 represent devices, such as capacitors, capable of storing and discharging a charge. Therefore, the top portion A (shown with dotted line) of FIG. 2E may be capable of acting as an energy pendulum in which charge may be stored in C1 or C2, alternatively. While charge is in transit through second coil winding 18b, a change in current through second coil winding 18b may induce an electromagnetic force, applying a torque to one or more rotor teeth.

While energy in the resonance circuit may be converted to work or lost as charge oscillates between C1 and C2, the lower portion of FIG. 2E may be capable of introducing additional energy as current into second coil winding 18b. In one embodiment, a ratio of turns about stator tooth 16 of first coil winding 18a to turns about stator tooth 16 of second coil winding 18b may be selected to achieve a step-up transformer effect. For instance, acceptable ratios may include, but are not limited to, 1:2, 1:3, 1:5, and 1:10. Thus, an electromagnetic field (EMF) responsive to changing current in first coil winding 18a may generate a desired current in second coil winding 18b that may be added to current between charge storage devices C1 and C2. For instance, in one embodiment, second coil winding 18b may have 10× more turns than first coil winding 18a, such as to enable an increased voltage on second coil winding 18b. Of course, any other appropriate ratio may be selected according to desired operation and operational parameters (e.g., input voltage, desired output voltage, etc.), and claimed subject matter is not limited in this respect.

TABLE 3

| Time $t_i$ | Charge in volts (V) | | |
| --- | --- | --- | --- |
| | $C_1$ | 18b | $C_2$ |
| $t_0$ | $V_1$ | 0 V | 0 V |
| $t_1$ | 0 V | $V_1$ | 0 V |
| $t_2$ | 0 V | 0 V | $V_2$ |
| $t_3$ | 0 V | $V_3$ | $V_2$ |

Table 3 illustrates charge location in the resonance circuit of FIG. 2E at a plurality of points in time, $t_i$. For simplicity, it is assumed that the resonance circuit is a simplified ideal circuit. Accordingly, in one embodiment, at a first time $t_0$, a first voltage $V_1$ may be stored in charge storage device C1. Charge storage device C1 may tend to equalize its voltage with that of charge storage device C2. Therefore, at a second time $t_1$, charge may be driven from charge storage device C1 through second coil winding 18b. Changes in current in second coil winding 18b may induce a magnetic force, applying a torque to a rotor. Once charged, however, second coil winding 18b may tend to discharge and drive charge back to charge storage devices C1 and/or C2. As such, at a third time, $t_2$, charge may be driven to charge storage device C2. Thus, a second voltage (e.g., $V_2$, where $V_1 \approx -V_2$) may be stored at charge storage device C2. At a fourth time, $t_3$, additional charge may be generated in second coil winding 18b. For instance, current may be affected in second coil winding 18b by driving a current from a power source PS (e.g., a battery) through first coil winding 18a. The current generated in second coil winding 18b (e.g., corresponding to a voltage $V_3$ across terminals of second coil winding 18b)

may then be added to or otherwise combined with the charge oscillating between charge storage devices C1 and C2 (e.g., referred to as an energy pendulum in FIG. 2E), such as to facilitate operation of an electric motor 10. The arrangement of PS, 18a, S1, C2 and D1 in FIG. 2E may form what may be referred to as a switched inductor boost circuit. As such, while current may be generated in second coil winding 18b responsive to an EMF, current in second coil winding 18b may also be based at least partly on current generated from the switched inductor boost circuit. Thus, in one implementation, diode D1 may serve to keep current from being generated in first coil winding 18a and diode D1 may also serve as part of the switched inductor boost circuit to transfer charge from the switched inductor boost circuit to the top portion A.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

Operation described above may, in some cases, be performed using control circuitry, such as controller 24 and/or driver 22 in FIG. 1A. While such control circuitry may be formed on separate devices, in some cases it may be desirable to form one or more controllers and/or drivers (e.g., controllers 24 and/or drivers 22) on a single device. For example, multiple drivers 22 may be formed in a single device using any one of several suitable CMOS processing technologies, for example. In other implementations, multiple drivers may be formed along with a processor (e.g., digital controller or microprocessor core) on a single device (e.g., as a system on a chip). Such a processor may provide signals to control the opening and closing of switches for multiple drivers controlling coil windings for multiple stator teeth of a motor. In a particular implementation, such a single device integrating a processor and multiple drivers may comprise a package with multiple external terminals (e.g., a ball grid array package) mountable to a printed circuit board. For example, the external terminals of the package may be coupled to charge storage devices (e.g., capacitors), one or more windings of respective stator teeth and a power supply 26 that are integrated with a motor. Of course, other embodiments are contemplated by the present description, such as, for example, drivers capable of coupling to a plurality of coil winding sets. The coil winding sets may be electrically coupled in series or parallel, such as to accommodate larger and/or fewer drivers, etc., such as according to design constraints.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

CONCLUSION

In one embodiment, an apparatus includes a rotor having a plurality of rotor teeth, wherein the plurality of rotor teeth are arranged to have a non-uniform angular spacing. The apparatus also includes a stator having a plurality of stator teeth.

In one implementation of the apparatus, the non-uniform angular spacing of the plurality of rotor teeth is such that for at least a subset of the plurality of rotor teeth comprising a first, a second, and a third rotor tooth, the first, second, and third rotor teeth being arranged consecutively, an angular spacing between the first and the second rotor teeth is at least twice an angular spacing between the second and the third rotor teeth.

In one implementation of the apparatus, the non-uniform angular spacing of the plurality of rotor teeth is such that for a given rotor tooth, an angular spacing to a first adjacent rotor tooth in a first direction is at least twice an angular spacing to a second adjacent rotor tooth in a second direction.

In one implementation of the apparatus, a ratio of stator teeth to rotor teeth is between 2.5 and 3.5 to 1.

In one implementation of the apparatus, the plurality of stator teeth comprise aluminum coil windings.

In one implementation of the apparatus, the rotor comprises a trench depth greater than or equal to one half an arc length between adjacent rotor teeth of the plurality of rotor teeth.

In one embodiment, a method comprises generating a first electromagnetic force and a second electromagnetic force. The first electromagnetic force is of a first magnitude on a first stator tooth of a stator of an electric motor. And the second electromagnetic force is of a second magnitude less than the first magnitude on a second stator tooth adjacent to the first stator tooth. The first magnetic force provides a torque to one or more non-uniformly angularly spaced rotor teeth of a rotor of the electric motor.

In one implementation of the method, the method also includes generating a flowing wavefront using one or more DC pulses driven through one or more coil windings of the stator.

In one implementation of the method, the second magnitude is approximately half the first magnitude.

In one implementation of the method, the method also includes generating a third electromagnetic force on a third stator tooth of the electric motor. In this implementation, the third stator tooth is also adjacent to the first stator tooth and the third electromagnetic force has a third magnitude approximately equal to the second magnitude.

In one implementation of the method, at least one of the second electromagnetic force and the third electromagnetic force is decreasing over a time period.

In one implementation of the method, at least one of the second electromagnetic force and the third electromagnetic force is increasing over a time period.

In one implementation of the method, the method also includes: decreasing the magnitude of the first electromagnetic force to yield a third magnitude, and increasing the magnitude of the second electromagnetic force to yield a fourth magnitude. In this implementation, the third magnitude is approximately half the fourth magnitude.

In one implementation of the method, the method also includes generating a third electromagnetic force on a third stator tooth adjacent to the second stator tooth. In this implementation, the third electromagnetic force has a fifth magnitude approximately equal to the third magnitude.

One embodiment of an electric motor includes: control circuitry comprising a processing element and a driver; a stator comprising a plurality of stator teeth; and a rotor comprising a plurality of rotor teeth, wherein the plurality of rotor teeth comprise a non-uniform angular spacing.

In one implementation of the electric motor, the electric motor also includes circuitry to recapture charge.

In one implementation of the electric motor, the circuitry to recapture charge comprises at least one switch and at least one charge storage device.

In one implementation of the electric motor, in response to one or more current pulses from the control circuitry, the rotor is capable of rotating at at least approximately 4000 RPM.

In one implementation of the electric motor, the rotor has a trench depth greater than or equal to one half an arc length between adjacent rotor teeth of the plurality of rotor teeth.

In one implementation of the electric motor, the plurality of stator teeth comprise aluminum coil windings.

What is claimed is:

1. An apparatus comprising:
    a rotor to have a plurality of rotor teeth, wherein the plurality of rotor teeth are to be arranged to have a non-uniform angular spacing; and
    a stator to have a plurality of stator teeth,
    wherein the rotor to be disposed within the stator, wherein the non-uniform angular spacing of the plurality of rotor teeth to be such that for at least a subset of the plurality of rotor teeth to comprise a first rotor tooth having a first tooth axis, a second rotor tooth having a second tooth axis, and a third rotor tooth having a third tooth axis, the first, second, and third rotor teeth to be arranged consecutively, a first angle between the first tooth axis and the second tooth axis to be at least twice that of a second angle between the second tooth axis and the third tooth axis,
    wherein the rotor to comprise a trench depth greater than or equal to one half an arc length between adjacent rotor teeth of the plurality of rotor teeth, wherein the arc length between the adjacent rotor teeth to be equal to or greater than any other arc length between any other adjacent teeth of the plurality of rotor teeth, wherein the arc length to comprise a distance between radially outward extremities of interior surfaces of the adjacent rotor teeth, and wherein the any other arc length to comprise another distance between radially outward extremities of interior surfaces of the any other adjacent rotor teeth.

2. The apparatus of claim 1, wherein a ratio of stator teeth to rotor teeth to be between 2.5 and 3.5 to 1.

3. The apparatus of claim 1, wherein the plurality of stator teeth to comprise aluminum coil windings.

4. An apparatus comprising:
    a rotor to have a plurality of rotor teeth, wherein the plurality of rotor teeth to be arranged to have a non-uniform angular spacing; and
    a stator to have a plurality of stator teeth,
    wherein the rotor to be disposed within the stator, wherein the rotor to comprise a trench depth greater than or equal to one half an arc length between adjacent rotor teeth of the plurality of rotor teeth, wherein the arc length between the adjacent rotor teeth to be equal to or greater than any other arc length between any other adjacent teeth of the plurality of rotor teeth, wherein the arc length to comprise a distance between radially outward extremities of interior surfaces of the adjacent rotor teeth, and wherein the any other arc length to comprise another distance between radially outward extremities of interior surfaces of the any other adjacent rotor teeth.

5. The apparatus of claim 4 further comprising:
    means for generating a first electromagnetic force of a first magnitude on a first stator tooth of the plurality of stator teeth; and
    means for generating a second electromagnetic force of a second magnitude less than the first magnitude on a second stator tooth of the plurality of stator teeth, wherein the second stator tooth to be disposed adjacent to the first stator tooth,
    wherein the first magnetic force to provide a torque to one or more of the plurality of rotor teeth.

6. An electric motor comprising:
    control circuitry to comprise a processing element and a driver;
    a stator to comprise a plurality of stator teeth having one or more coil windings electrically coupled to the control circuitry; and
    a rotor to be disposed within the stator and to comprise a plurality of rotor teeth, wherein the plurality of rotor teeth comprise a non-uniform angular spacing,
    wherein the non-uniform angular spacing of the plurality of rotor teeth to be such that for at least a subset of the plurality of rotor teeth comprising a first rotor tooth having a first tooth axis, a second rotor tooth having a second tooth axis, and a third rotor tooth having a third tooth axis, the first, second, and third rotor teeth being arranged consecutively, a first angle between the first tooth axis and the second tooth axis to be at least twice that of a second angle between the second tooth axis and the third tooth axis,
    wherein the rotor to have a trench depth greater than or equal to one half an arc length between adjacent rotor teeth of the plurality of rotor teeth, wherein the arc length between the adjacent rotor teeth to be equal to or greater than any other arc length between any other adjacent teeth of the plurality of rotor teeth, wherein the arc length to comprise a distance between radially outward extremities of interior surfaces of the adjacent rotor teeth, and wherein the any other arc length to comprise another distance between radially outward extremities of interior surfaces of the any other adjacent rotor teeth.

7. The electric motor of claim 6, wherein the control circuitry further to comprise circuitry to recapture charge.

8. The electric motor of claim 7, wherein the circuitry to recapture charge to comprise at least one switch and at least one charge storage device.

9. The electric motor of claim 8, wherein responsive to one or more current pulses from the control circuitry the rotor to be capable of rotating at at least approximately 4000 RPM.

10. The electric motor of claim 6, wherein the plurality of stator teeth to comprise aluminum coil windings.

11. The electric motor of claim 6, wherein
    the control circuitry to generate a first electromagnetic force of a first magnitude on a first stator tooth of the plurality of stator teeth,
    the control circuitry further to generate a second electromagnetic force of a second magnitude less than the first magnitude on a second stator tooth of the plurality of stator teeth, the second stator tooth to be disposed adjacent to the first stator tooth, and the first magnetic force to provide a torque to one or more of the non-uniformly angularly spaced rotor teeth of the rotor.

12. An electric motor comprising:

control circuitry to comprise a processing element and a driver;

a stator to comprise a plurality of stator teeth having one or more coil windings electrically coupled to the control circuitry; and a rotor to be disposed within the stator and to comprise a plurality of rotor teeth, wherein the plurality of rotor teeth comprise a non-uniform angular spacing, wherein the rotor to have a trench depth greater than or equal to one half an arc length between adjacent rotor teeth of the plurality of rotor teeth, wherein the arc length between the adjacent rotor teeth to be equal to or greater than any other arc length between any other adjacent teeth of the plurality of rotor teeth, wherein the arc length to comprise a distance between radially outward extremities of interior surfaces of the adjacent rotor teeth, and wherein the any other arc length to comprise another distance between radially outward extremities of interior surfaces of the any other adjacent rotor teeth.

* * * * *